Oct. 25, 1927.

V. LLÉDO 1,646,412

CONTINUALLY WORKING MACHINE FOR MOLDING AND MARKING BY COMPRESSION PLASTIC MATERIALS

Original Filed Dec. 17, 1924   2 Sheets-Sheet 1

INVENTOR:
Vincent Llédo
BY: Francis E. Boyer
ATTORNEY

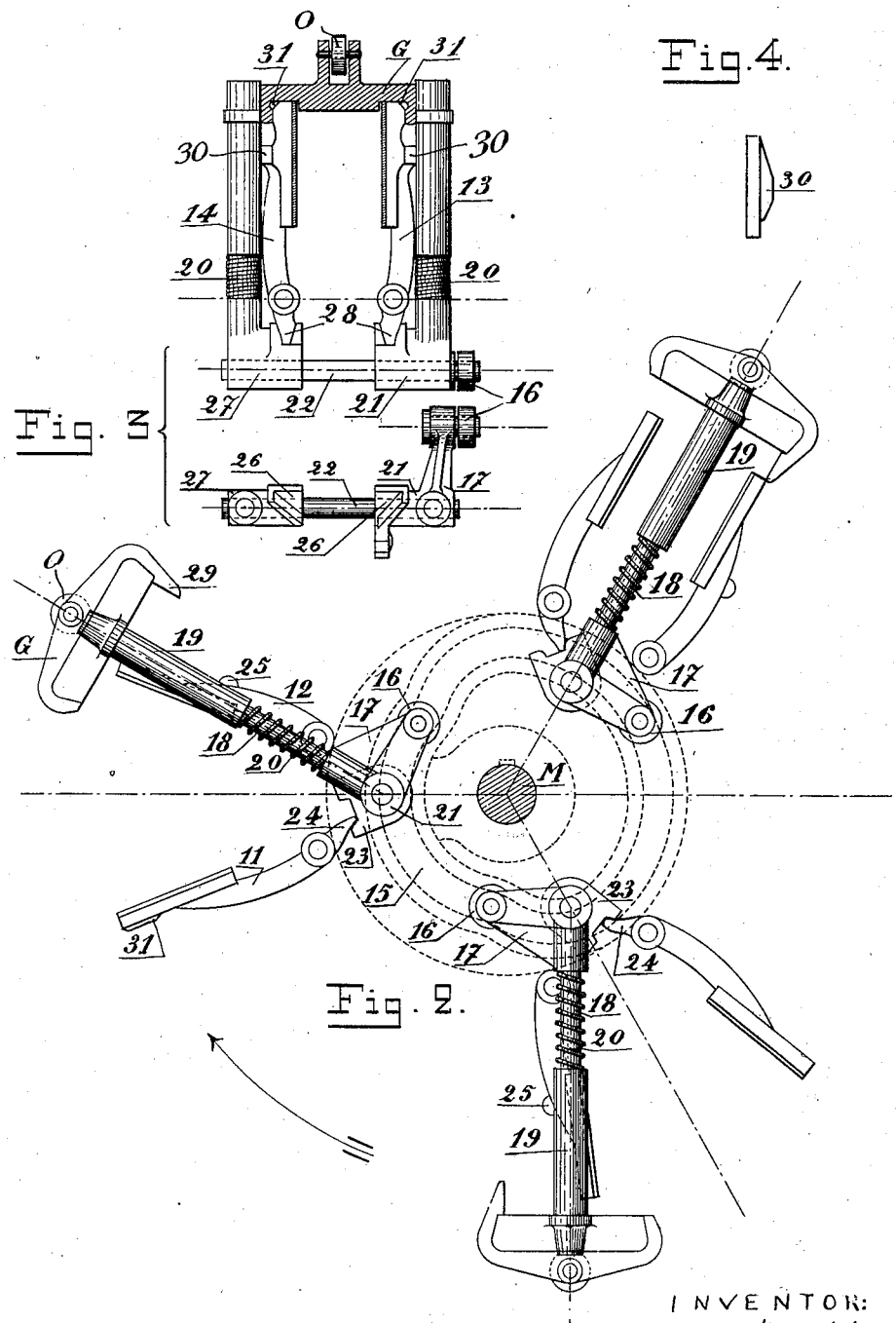

Patented Oct. 25, 1927.

1,646,412

UNITED STATES PATENT OFFICE.

VINCENT LLÉDO, OF MARSEILLE, FRANCE.

CONTINUALLY-WORKING MACHINE FOR MOLDING AND MARKING BY COMPRESSION PLASTIC MATERIALS.

Application filed December 17, 1924, Serial No. 756,413, and in France December 18, 1923. Renewed September 9, 1927.

This invention refers to continually working machines for molding and marking by compression plastic materials such as soap, agglomerated coal, food products, and the like; the device being so disposed that no stops or shocks which could diminish the speed and consequently the output may happen; all the movements being automatically coordinated, it is thus possible to reduce labor to a minimum.

The invention is described in one of its embodiments with reference to the accompanying drawings in which:

Fig. 2 shows in a larger scale and in side view the device for operating the lids and sides of the molds.

Fig. 3 shows respectively in front view and in plan view the means for separating the sides and the mold lid in its closed position.

Fig. 4 is a diagrammatical plan view on edge of the top part of the mold sides showing the inclined plan used to close in these sides.

Figure 1:
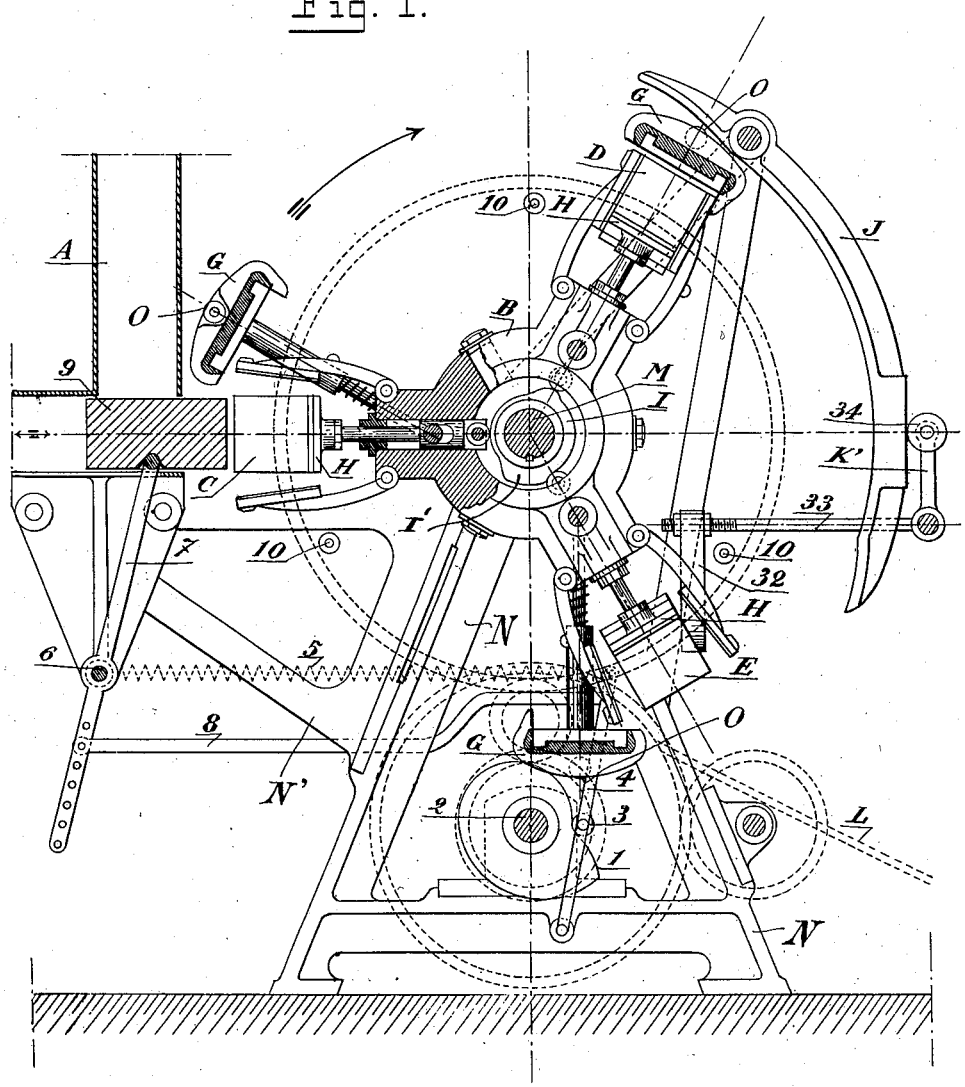
Fig. 1 is a side view, partly in section of the whole machine showing more particularly the means for operating the pistons.

In itself the molding and marking machine comprises four principal devices, viz:
1. The feeding means for the material to be molded.
2. The means opening the sides of the mold.
3. The device closing the sides on the material to be formed.
4. The compression device for the plastic material, to obtain its molding, Fig. 1 more particularly and other figures as a reference.

The machine according to the invention is mounted on a frame N carrying the feeding device support N'.

The feeding of the material to be formed is done by a distributor A (Fig. 1) worked by the cam 1 fixed on the shaft 2 in contact with the roller 3 secured to lever 4 which holds at its upper part one of the extremities of a tension spring 5 the other extremity of which is connected to shaft 6 on which rocks the arm 7; this arm is connected to lever 4 by the rod 8 (on the drawings the spring 5 and rod 8 are shown in dotted lines); by means of a reciprocating movement governed by the relative position of the extremity of rod 8 on the lower extremity of lever 7 fitting it to one of several holes provided to this purpose, the rockable arm or lever 7 moves the slide 9 disposed at the bottom of the feeding device A and pushes the material to be stamped or pressed towards the interior of the molds C, D, E, at the required speed.

A known stop device not shown on the drawings is controlled in the known way by the rollers 10 fixed in connection with the toothed wheel moving with the piece B; it allows if any one of the molds C, D, E, is out of action, to remove one of the stop rollers corresponding to the mold and to stop the slide 9 of the distributor during the passage in front of it of the damaged mold; the cam 1 serves to variably span the spring 5.

The divarication of the side walling of the mold is obtained by the device illustrated in Fig. 2 which operates the transversal sides 11 and 12, the longitudinal sides 13 and 14 and displaces the lid G.

A cam 15, shown in dotted lines on the drawings is rigidly connected to the fixed shaft M, the working profile of this cam is in form of a groove and guides roller 16 secured to lever 17 carrying a casing to which is fixed the rod 18, partly enveloped in its length by the bush 19 fixed in its upper extremity to the lid G provided with the tension spring 20.

The opening or closing of the mold walls is obtained only by the displacement of the roller 16 along the groove 15 constituting the cam.

The lever 17 is provided with the hub 21 through which passes the shaft 22 upon which it is fixed. A slide 23 with two stops displaces in its movement the tooth 24 which is the inferior portion of part 11; that is the one lever arm carrying the side wallings operating the pressure.

The opening of side 12 is ensured by the meeting of the bush 19 with the stops 25 protruding from part 12.

The hub 21 has also a small inclined plane 26 (Fig. 3) reproduced in the inversed direction on the hub 27, equally fixed on the shaft 22; each of these inclined planes guide and move the tenons 28 constituting the inferior part of the sides 13 and 14. The movement of the roller 16 on the cam 15 causes the opening of the form sides 11, 12, 13 and 14 when getting nearer to the centre of the rotating system.

The closing down of the sides on the material to be molded is obtained by the displacement away from the centre of the cam 15 of the roller 16, this displacement operates in the opposite direction all parts operating them as shown in the drawings and only side 12 is guided by the abutment 29 (Fig. 2) of the lid G.

The compression of the plastic material contained in the molds is realized for the longitudinal sides 13 and 14 by the inclined plane 30 (Fig. 4) disposed on the exterior face of each of these sides, the inclined plane comes in contact with the bush 19 and ensures thus on the two faces a primary compression.

In its movement the lever 17 has replaced the lid G above the four lateral sides now in touch with each other; each of these sides is provided with an inclined plan facilitating their total clinching and closing by the lid the pression of which as ensured by the slide J upon which forces in its movement the roller O (Fig. 1) the resistance to displacement of the lid being obtained by the adjustable counterweight 32 mounted on the lever 33 secured to the contracting roller 34 supported by the arm K'.

The closing down of the lid G corresponds to the displacement of the bottom H forming a piston provided with the rod and spring and driving roller moved by the cam 1 the profile of which conveniently studied, corresponds to all movements required for a good compression and for those necessary for an easy delivery of the finished article to this effect the embossment I' of the cam I may be controlled from the outside of the machine by means of an excentre or of any other known means so as to vary the race of the bottom H; at the moment all parts of the mold are under a pressure strain and the material to be pressed from every side receives the impressions of the figures or text placed upon each of the faces of the sides of the lid and of the bottom the whole of which forms the mold.

Continuing the rotation movement each of the molds leaves in its turn the slide J, and the springs 20, highly compressed (Fig. 3) are released, the lid G, is lifted freeing thus all the sides, whilst the roller 16 coming nearer to the centre of the cam 15 moves the lever 17 producing the opening of the sides setting free the molded material which slips out of the mold and falls on the band L; the open mold passes again before the feeder A for another operation.

It is to be remarked that the compression phase of the material in work is maintained during a time sufficiently long to obtain the perfect molding and that the delivery is normally produced without damaging the molded form or otherwise altering the impressed marks.

I declare that what I claim is:

A continually working machine for molding and marking by pressure plastic stuffs such as soap and the like, composed of a plurality of in a star form disposed pressing and molding boxes the sides, the tops and bottoms of which are movable each with reference to the others, in which an adjustable sliding organ moves reciprocatingly to supply the stuff to be molded to form boxes the sides of which relatively movable the one with reference to the other are controlled in a known way by a lever engaging on a cam track disposed on a disc fixed to the main driving axis whilst the pressure on the lids of the molding boxes is within certain limits adjustably controlled by a cam track disposed exteriorly at the moment of contact, said track being under the influence of a weight thus governing the pressure on the lids of the molding boxes pressing on the sides so that the boxes are closed and finally the bottom of the molding boxes, acting as a piston, reciprocally movable under the control and by means of a cam disposed on the driving axis of the machine ejects the finished pieces of stuff.

In testimony whereof I have signed my name to this specification.

VINCENT LLEDO.